Patented Sept. 17, 1935

2,014,403

UNITED STATES PATENT OFFICE 2,014,403

COMPOSITION

Charles Sterling Webber, Springfield, Mass., assignor to The Fiberloid Corporation, Indian Orchard, Mass., a corporation of Massachusetts No Drawing. Application January 19, 1934,
Serial No. 707,337

2 Claims. (Cl. 106—40)

This invention is directed to the provision of an improved cellulose derivative composition and relates more particularly to compositions of matter in which cellulose derivatives, such as cellulose acetate, cellulose nitrate, or cellulose ethers, are combined with a compatible plasticizer by means of a common solvent for both, with or without useful addition agents, to provide an improved product which is desirable for use in the plastic and analogous arts. The composition of this invention is particularly advantageous for use in the manufacture of sheets, rods or tubes, molding compounds, wrapping sheets or tissues, artificial silk, varnishes or lacquers, artificial leather dopes, paper coatings and the like.

It has long been known that plastic compositions in which cellulose derivatives are essential constituents must include such conditioning or plasticizing agents as ethyl toluene sulphonamide, diethyl phthalate, triphenyl phosphate or the like before they may be used in the various plastic arts. Some of these substances are also used because of their flame-retarding qualities. But most of them, however satisfactory they may be as plastic-inducing and flame retarding agents, are not active solvents for the commercially useful types of cellulose esters, such as acetone-soluble cellulose acetate. Consequently, heating, bending or storing these compositions may cause them to exude one or more of the plastic-inducing agents to the surface, where, of course, they are no longer useful for the purpose for which they were added. These exuded compounds also are objectionable when the material is to be used in contact with edibles because of their probable objectionable flavor or toxicological properties.

It is the principal object of this invention to provide a cellulose derivative composition which is permanently transparent, clear and tough. It is a further object of this invention to provide a cellulose ester composition that will not exude the liquid plasticizer to the surface either in storage or in the various fabricating processes, such as press polishing, molding, and extrusion, where heat and/or pressure are employed.

Another object of this invention is to provide an active solvent plasticizer for cellulose acetate or nitrate such that by application of heat alone a pliable yet tough plastic results which may be flowed under pressure. A further object of my invention is the provision of compositions of matter suitable for use in laminated glass compositions that are clear, water-white, tough and do not discolor appreciably on exposure to sunlight, or other actinic rays.

Furthermore, it is my object to produce a novel cellulose derivative composition plasticized with a material that is relatively non-volatile so that after a period of years the plastic retains its suppleness. These and other objects will become apparent to those skilled in the art to which this invention pertains as my composition is disclosed.

It is not only difficult to obtain a plastic-inducing agent which does not exude to the surface of cellulose organic ester plastics but there are relatively few commercially available organic substances which are at the same time high-boiling, water-white and transparent and which do not discolor on exposure to light and/or heat.

I have found a plasticizer which is an active solvent for cellulose organic esters at or about 100° C. and which will not exude to the surface of the composition either during processing or subsequently. That is to say, I have conceived a novel composition of matter which is adapted for polishing, molding or the like, even under high temperatures and pressures, and this is provided by adding to compositions containing cellulose derivatives as a plasticizing compound esters of polyglycerols.

It is perhaps advisable to explain that these esters of polyglycerols may be prepared by esterifying the internal condensation products of glycerol produced by heating glycerol alone over extended periods at elevated temperatures or by heating for shorter intervals at elevated temperatures in the presence of a catalyst, such as anhydrous sodium acetate. In this condensation process, two molecules of glycerol are caused to lose one molecule of water between them, three molecules of glycerol are caused to lose two molecules of water, and so on. The molecules of glycerol are thereby united in pairs, triplets, and so on, by oxygen or ether linkages. Of course, the extent of this condensation depends upon the time, temperature and catalyst employed.

In order to esterify condensation products of glycerol, it is desirable to heat the same with an aliphatic acid, such as glacial acetic acid or propionic acid, for example, under reflux, or by slowly distilling off a portion of the acid with the water formed during the course of the reaction. Of course, a mixed polyglycerol ester, such as an acetic-propionic mixed ester may be produced, if desired. In order to obtain complete esterification, it may be necessary to add the anhydride of the aliphatic acid or another organic acid.

The resultant product may be purified by removing the more volatile esters of the uncondensed glycerol and uncombined acids and/or anhydride by distillation in a vacuum or the mixture may be used directly after washing with water to remove the catalyst and free acid. However, it is not desirable to attempt to vacuum-distill the esters of the polyglycerols since they are so high boiling that they undergo decomposition, thereupon giving off an objectionable odor, and tend to discolor. Furthermore, the polyglycerol esters are nearly absolutely non-volatile and large losses in yield consequently result if vacuum distillation to volatilize is attempted.

But, it is because of this non-volatile nature of the polyglycerol esters that they are particularly suitable for service as plasticizers in cellulose ester compositions. Furthermore, polyglycerol esters also possess active solvent action for cellulose organic esters whereby the objectionable exuding to the surface of the plasticizer when heat and pressure are applied is obviated.

According to the preferred form of the invention, my cellulose ester composition contains from 10 to 100 parts of acetic ester of polyglycerol or propionic ester of polyglycerol to 100 parts of cellulose acetate. It is desired to point out that the proportion of the glycerols may vary depending upon whether a more rigid and/or pliable product is desired, but perhaps the most satisfactory composition consists of about 50 parts of the polyglycerol ester to 100 parts by weight of the cellulose derivative.

It is desirable, of course, to add a common solvent to the mixture of the cellulose and polyglycerol esters to aid the colloiding action and bring about a more intimate mixture.

It may be pointed out that the plasticizers which I have mentioned may be compounded with other organic esters of cellulose besides cellulose nitrate and acetate such as cellulose propionates, stearates, benzoates, etc., or mixed esters containing one or more acid radicals, such as cellulose aceto-propionate.

Also, additional adjuvants may be added to the cellulose derivative composition such as triphenyl phosphate, tricresyl phosphate, dimethyl phthalate, dibutyl phthalate, castor-oil and the like. These adjuvants are useful in that they further modify the inflammability, water permeability, and flexibility of the composition, as is well-known in the art.

The compositions of this invention which contain polyglycerol organic esters and cellulose derivatives may be made into sheets, rods or the like which are permanently transparent and clear yet tough and flexible. The composition may be in the form of a powder or the like and is particularly adapted for molding under heat and pressure. Furthermore, the compound is unusually suitable both for use in laminated non-shatterable glass composites and in the manufacture of artificial silk, wrapping tissues, and coatings for artificial leather and the like.

While I have described my invention in great detail and with respect to preferred embodiments thereof, I do not desire to be limited to such detail or embodiments since many changes and modifications may be made without departing from the spirit and scope of the invention in its broader aspects. Hence, what I desire to claim as new and secure by Letters Patent of the United States is:

1. A composition of matter comprising cellulose esters and the mixed propionic and acetic esters of polyglycerols.

2. A composition of matter comprising 100 parts of cellulose acetate and from 10 to 100 parts by weight of the mixed propionic and acetic acid esters of polyglycerols.

CHARLES STERLING WEBBER.